United States Patent
Zou et al.

(10) Patent No.: US 10,219,290 B2
(45) Date of Patent: Feb. 26, 2019

(54) METHOD, DEVICE, AND SYSTEM FOR CONTENT DELIVERY NETWORK-BASED MOBILE TERMINAL TRAFFIC PROCESSING

(71) Applicant: WANGSU SCIENCE & TECHNOLOGY CO., LTD., Shanghai (CN)

(72) Inventors: Shuang Zou, Shanghai (CN); Zhongwang Huang, Shanghai (CN); Shibiao Lv, Shanghai (CN); Hong Chen, Shanghai (CN); Bixia Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 145 days.

(21) Appl. No.: 15/524,301

(22) PCT Filed: Jul. 1, 2015

(86) PCT No.: PCT/CN2015/083112
§ 371 (c)(1),
(2) Date: May 4, 2017

(87) PCT Pub. No.: WO2016/145753
PCT Pub. Date: Sep. 22, 2016

(65) Prior Publication Data
US 2018/0295640 A1     Oct. 11, 2018

(30) Foreign Application Priority Data
Mar. 17, 2015    (CN) .......................... 2015 1 0117473

(51) Int. Cl.
*H04L 12/28*        (2006.01)
*H04W 72/12*       (2009.01)
(Continued)

(52) U.S. Cl.
CPC ..... *H04W 72/1252* (2013.01); *H04L 47/2408* (2013.01); *H04L 47/2475* (2013.01);
(Continued)

(58) Field of Classification Search
USPC ................................ 370/252, 329, 386, 389
See application file for complete search history.

(56) References Cited

U.S. PATENT DOCUMENTS

2003/0058874 A1    3/2003   Sahaya et al.
2010/0034089 A1    2/2010   Kovvali et al.
(Continued)

FOREIGN PATENT DOCUMENTS

CN    101022571 A    8/2007
CN    101242422 A    8/2008
(Continued)

OTHER PUBLICATIONS

The European Patent Office (EPO) The Extended European Search Report for 15885136.0 dated Oct. 11, 2017 7 Pages.
(Continued)

*Primary Examiner* — John Pezzlo
(74) *Attorney, Agent, or Firm* — Anova Law Group, PLLC

(57) ABSTRACT

The present disclosure provides a method, a device, and a system for content delivery network (CDN)-based mobile terminal traffic processing. The method includes: sending, by a mobile terminal, data information to a scheduling mechanism, wherein the scheduling mechanism is configured to determine addresses of first target service nodes based on the data information; receiving, by the mobile terminal, the addresses of the first target service nodes; determining, by the mobile terminal, the first target service nodes, the first target service nodes being service nodes corresponding to the addresses of the first target service
(Continued)

nodes; determining, by the mobile terminal, service types of application traffic; and directing, by the mobile terminal, the application traffic to the first target service nodes based on the addresses of service nodes and the service types of the application traffic.

15 Claims, 6 Drawing Sheets

(51) Int. Cl.
*H04W 28/10* (2009.01)
*H04L 29/08* (2006.01)
*H04L 12/851* (2013.01)
*H04L 12/859* (2013.01)
*H04J 1/16* (2006.01)

(52) U.S. Cl.
CPC .............. *H04L 67/14* (2013.01); *H04L 67/18* (2013.01); *H04L 67/28* (2013.01); *H04L 67/2842* (2013.01); *H04W 28/10* (2013.01)

(56) References Cited

U.S. PATENT DOCUMENTS

2014/0344400 A1* 11/2014 Varney .................. H04L 45/745
709/217
2015/0070585 A1* 3/2015 Sharif-Ahmadi ...... G08C 17/02
348/564

FOREIGN PATENT DOCUMENTS

| CN | 102196060 A | 9/2011 |
| CN | 103747043 A | 4/2014 |
| CN | 103763209 A | 4/2014 |
| CN | 104333568 A | 2/2015 |
| EP | 2597906 A1 | 5/2013 |
| KR | 20090000028 A | 1/2009 |

OTHER PUBLICATIONS

The European Patent Office (EPO) International Search Report for PCT/CN2015083112 dated Oct. 11, 2017 7 Pages.
The World Intellectual Property Organization (WIPO) International Search Report for PCT/CN2015/083112 dated Dec. 17, 2015.

* cited by examiner

METHOD, DEVICE, AND SYSTEM FOR CONTENT DELIVERY NETWORK-BASED MOBILE TERMINAL TRAFFIC PROCESSING

CROSS-REFERENCES TO RELATED APPLICATIONS

This patent application is a national phase entry under 35 U.S.C. § 371 of PCT Application No. PCT/CN2015/083112 filed on Jul. 1, 2015, which claims priority of Chinese patent application No. 201510117473.4, filed on Mar. 17, 2015, the entire content of all of which is incorporated herein by reference.

FIELD OF THE DISCLOSURE

The present disclosure generally relates to the field of internet technology and, specifically, relates to a method, a device, and a system for content delivery network-based mobile terminal traffic processing.

BACKGROUND

The basic idea of content delivery network (CDN) is to avoid bottlenecks and links that can affect the speed and stability of data transmission in the internet as much as possible, to transmit data with higher speed and higher stability. By arranging node servers at different locations in the network to form a smart virtual network based on the existing internet, CDN may redirect a user's request, in real-time, to a closest server node based on comprehensive information such as network traffic, connection at each node, load condition, distance to the user, and response time. The goal is facilitating the user to obtain desired content from a closest server, resolving internet congestion, and increasing the response speed when a user accesses a website. In the recent years, the development of smart phones has greatly improved users' internet browsing experience, the wide spread usage of smart phones enables mobile web browsing to become an extension of PC web browsing, and a large portion of traditional internet users gradually merge to mobile phone network. Mobile network has increasingly evolved to an important entrance and a main platform for innovation of internet operation, and has become an important information hub for information communication for new social media, e-commerce, and various new applications. Mobile internet has great market potential and is releasing the potential in high speed.

Conventional CDN is often applied in fixed networks, and has inferior optimization effect on mobile network. The reasons include:

1. A fixed network has simple environment, and is often connected to a user through ADSL dial-up or fiber access; while a mobile network has complex environment, 2G, 2.5G, 3G, 4G, and WiFi, and each standard includes many types based on different carriers, for example 3G includes WCDMA, CDMA2000, TD-SCDMA, etc. Each standard and type has its own special features, and the methods for optimization are quite different.

2. A fixed network has high speed, small fluctuations, and fairly consistent user experience, so that conventional CDN manufacturers and clients often emphasize on throughput and usability rather than speed. A mobile network has lower speed, higher fluctuations, is susceptible to network malfunctioning, and its user experience is significantly lower than fixed networks. Thus, the transmission speed of the mobile network is desired to be significantly increased.

In addition, when conventional CDN is applied in the mobile network, the following shortcomings exist:

1. The traffic scheduling, based on the domain name system (DNS), has fairly low accuracy, and is susceptible to DNS pollution and traffic hijacking. Also, when a services node is malfunctioning, the service node may be blocked through DNS. The wait time for effective network access is overly long, causing the speed to access network in the mobile network applied with CDN to be undesirably low.

2. Often conventional CDN only supports a few mainstream protocols such as HTTP, and many applications supporting proprietary protocols do not support CDN service.

3. Express protocols such as HTTP have low security level. When a phone terminal is using a public WiFi hotspot, a higher security level is desired.

In view of the low accuracy in traffic scheduling in a mobile network applied with CDN, no effective solution has been provided so far.

BRIEF SUMMARY OF THE DISCLOSURE

A main goal of the present disclosure is to provide a method, a device, and a system for content delivery network (CDN)-based mobile terminal traffic processing, to solve the problems of low accuracy when CDN is applied in the mobile networks in the conventional technology.

To realize the abovementioned goal, one aspect of the present disclosure provides a method for CDN-based mobile terminal traffic processing. The method may include: sending, by a mobile terminal, data information to a scheduling mechanism, wherein the mobile terminal is installed with an application, when the application starts, the mobile terminal acquires data for service types configured for the application to obtain the data information, the scheduling mechanism being configured to determine addresses of first target service nodes based on the data information; receiving, by the mobile terminal, the addresses of the first target service nodes; determining, by the mobile terminal, the first target service nodes, the first target service nodes being service nodes corresponding to the addresses of the first target service nodes; determining, by the mobile terminal, service types of application traffic, wherein the service types of the application traffic are service types of the application recognized from traffic generated when the application executes network access; and directing, by the mobile terminal, the application traffic to the first target service nodes based on the addresses of service nodes and the service types of the application traffic.

2. Further, after the mobile terminal directs the application traffic to the first target service nodes based on the addresses of the service nodes and the service types of the application traffic, further includes: receiving, by the mobile terminal, addresses of second service nodes, wherein the addresses of the second service nodes are addresses of service nodes sent by the scheduling mechanism after a first preset period after sending the addresses of the first target service nodes; and directing, by the mobile terminal, the application traffic to the second service nodes based on the addresses of the second service nodes, wherein the second service nodes are service nodes corresponding to the addresses of the second service nodes.

Further, after the mobile terminal determines the first target service nodes, and before the mobile terminals determines the service types of the application traffic, further includes: sending, by the mobile terminal, a detection request to the first target service nodes, wherein the detection request includes a request for a path the application uses to access a domain name needed to be accessed through the first target service nodes; receiving, by the mobile terminal, a response information, wherein the response information includes information of response time of the path between a first target service node and a domain name needed to be accessed; sending, by the mobile terminal, the response information to the scheduling mechanism; and obtaining, by the mobile terminal, a first target link, wherein the first target link is a path determined by the scheduling mechanism based on the response information. The mobile terminal directs the application traffic to the first target service nodes based on the address of the service node and the service types of the application traffic includes: based on the first target link and the service types of the application traffic, directs the application traffic to the first target service nodes.

Further, the mobile terminal directing the application traffic to the first target service nodes based on the addresses of the service nodes and the service types of the application traffic includes: determining, by the mobile terminal, encryption algorithms and encryption levels configured for the service types of the application, where the scheduling mechanism configures the encryption algorithms and the encryption levels configured for the service types configured for the application based on the data information; creating, by the mobile terminal, a first connection to the first target service nodes, wherein the first connection includes a plurality of connections, the first connection being applied with different encryption algorithms and encryption levels; and based on the encryption algorithms and the encryption levels configured for the service types of the application, selecting, by the mobile terminal, the first connection to execute communication processing, and encryption and decryption processing.

Further, after the mobile terminal directs the application traffic to the first target service nodes based on the addresses of the service nodes and the service types of the application traffic, further includes: obtaining a first requested content sent by the application, wherein the first requested content is requested content sent by the application when executing network access; performing a compression encoding for the first requested content based on a preset compression algorithm and a preset compression level to obtain a first compressed content; and storing the first compressed content in a caching database.

Further, after storing the first compressed content in the caching database, further includes: receiving a second requested content sent by the application; detecting whether the second requested content is stored in the caching database; when the second requested content is stored in the caching database, obtaining, by the mobile terminal, content corresponding to the second requested content from the caching database; when the second requested content is not stored in the caching database, performing a compression encoding based on the preset compression algorithm and the preset compression level to obtain a second compressed content; storing the second compressed content in the caching database; and obtaining, by the mobile terminal, the second compressed content.

Further, after the mobile terminal directs the application traffic to the first target service nodes based on the addresses of the service nodes and the service types of the application traffic, further includes: transmitting, by the mobile terminal, a third requested content sent by the application to the first target service nodes, wherein the first target service nodes are configured to detect whether the third requested content matches with property information of the mobile terminal; when the third requested content mismatches with the property information of the mobile terminal, detecting whether the third requested content is stored in the caching database; when the third requested content is not stored in the caching database, obtaining original content of the third requested content, wherein the original content is content not processed by a source station; processing the original content to obtain a processing result, and the first target service nodes sending the processing result to the mobile terminal; and obtaining, by the mobile terminal, the processing result.

Further, the mobile terminal directing the application traffic to the first target service nodes based on the addresses of the service nodes and the service types of the application traffic includes: determining, by the mobile terminal, service types of the first target service nodes; based on the service types of the first target service node, selecting and creating a second connection based on a preset configuration of a session protocol, where the session protocol is a session-layer multi-stream tunneling protocol with byte compression and the second connection is a connection transmitting multi-stream in parallel; and transmitting, by the mobile terminal, a request sent by the application based on the second connection, where the request sent by the application corresponds to a data stream.

Further, the mobile terminal transmitting the request sent by the application based on the second connection includes: determining, by the mobile terminal, the data stream corresponding to the request sent by the application; and performing, by the mobile terminal, compression processing on the corresponding data stream.

Further, after the mobile terminal performs compression processing on the data stream further includes: determining, by the mobile terminal, whether protocol types are protocol types recognizable to the service types of the first target service nodes; when the protocol types are protocol types recognizable to the service types of the first target service nodes, transmitting the request sent by the mobile terminal using a non-tunneling method; and when the protocol types are protocol types not recognizable to the service types of the first target service nodes, transmitting the request sent by the mobile terminal using a tunneling method.

Further, the mobile terminal directing the application traffic to the first target service nodes based on the addresses of the service nodes and the service types of the application traffic includes: determining transport layer protocols and protocol stack parameters configured for the service types of the application, wherein the scheduling mechanism configures the transport layer protocols and protocol stack parameters for the service types of the application based on the data information; creating a third connection to the first target service nodes, wherein the third connection includes a plurality of connections, and different transport layer protocols and protocol stack parameters are used on the third connection; and selecting the third connection to execute communication processing based on the transport layer protocols and protocol stack parameters configured for the service types of the application.

To realize the abovementioned goal, another aspect of the present disclosure provides a method for CDN-based mobile terminal traffic terminal, including: receiving, by a scheduling mechanism, data information, wherein the mobile terminal is installed with an application, when the application starts, data of service types configured for the application is acquired to obtain the data information, the mobile terminal being configured to send the data information to the scheduling mechanism; determining, by the scheduling mechanism, addresses of first target service nodes based on the data information; and sending, by the scheduling mechanism, the addresses of the first target service nodes to the mobile terminal, wherein the mobile terminal receives the addresses of the first target service nodes, and determines the first target service nodes based on the addresses of the first target service nodes, the mobile terminal determining service types of the application traffic, the mobile terminal directing the application traffic to the first target service nodes based on addresses of the service nodes and the service type of application traffic, the first target service nodes being the service nodes corresponding to the addresses of the first target service nodes, the service types of the application traffic being the service types of the application recognized based on traffic generated when the application is executing network access.

To realize the abovementioned goal, another aspect of the present disclosure provides a device for CDN-based mobile terminal traffic terminal, including: a first sending unit, configured to send data information to a scheduling mechanism, wherein the first sending unit is installed with an application, when the application starts, data of service type configured for the application is acquired to obtain the data information, the scheduling mechanism being configured to determine addresses of first target service nodes based on the data information; a first receiving unit, configured to receive the addresses of the first target service nodes; a first determining unit, configured to determine the first target service nodes, the first target service nodes being service nodes corresponding to the addresses of the first target service nodes; a second determining unit, configured to determine service types of the application traffic, wherein the service types of the application traffic is service type of the application recognized based on traffic generated when the application is executing network access; and a directing unit, configured to direct the application traffic to the first target service nodes based on the addresses of the service nodes and the service types of the application traffic.

To realize the abovementioned goal, another aspect of the present disclosure provides a device for CDN-based mobile terminal traffic terminal including: a second receiving unit, configured to receive data information, wherein the mobile terminal is installed with an application, when the application starts, data of service types configured on the application is acquired to obtain the data information, the mobile terminal sending the data information to a second receiving unit; a third determining unit, configured to determine addresses of the first target service nodes based on the data information; and a second sending unit, configured to send the addresses of the first target service nodes to the mobile terminal, wherein the mobile terminal receives the addresses of the first target service nodes and determines the first target service nodes based on the addresses of the first target service nodes, the mobile terminal determines service types of application traffic, the mobile terminal directs the application traffic to the first target service nodes based on the addresses of the service nodes and the service types of the application traffic, the first target service nodes being service nodes corresponding to the addresses of the first target service nodes, and the service types of the application traffic being service types of the application recognized based on traffic generated when the application is executing network access.

To realize the abovementioned goal, another aspect of the present disclosure provides a system for CDN-based mobile terminal traffic terminal, including: a mobile terminal, installed with an application, when the application starts, the mobile terminal sends data information of the application to a scheduling mechanism, wherein the data information includes the data information of the service types of the application traffic; a service node, configured to direct the application traffic; and the scheduling mechanism, configured to determine addresses of service node based on the received data information and send the addresses of the service nodes to a traffic control module of the mobile terminal, wherein the traffic control module of the mobile terminal is configured to direct the application traffic to corresponding service nodes based on the addresses of the service nodes and the service types of application traffic, the service types of the application traffic being service types of the application recognized based on the traffic sent by the application.

Further, the mobile terminal is configured to obtain quality monitoring data, wherein the quality monitoring data is configured to analyze operation quality of the system; and the scheduling mechanism is further configured to receive the quality monitoring data sent from the mobile terminal, and execute analysis to obtain a result of analysis, the scheduling mechanism being configured to execute related processing based on the result of analysis.

Further, the scheduling mechanism is configured to sample operation quality data and operation parameters according to a second preset cycle, and adjust the operation parameters based on the operation quality data.

According to the present disclosure, the following steps may be executed: the mobile terminal receiving the address of the first target service node determined by the scheduling mechanism based on the data information, and determining the first target service node based on the address of the first target service node; the mobile terminal determining the service types of the application traffic, and the mobile terminal directing the application traffic to the first target service node based on the addresses of the service nodes and the service types of the application traffic. The present disclosure solves the problems of low accuracy when CDN is applied in the mobile networks in the conventional technology. The traffic scheduling may have improved accuracy, and higher speed to access network may be implemented.

BRIEF DESCRIPTION OF THE DRAWINGS

The drawings, being a part of the present disclosure, are used to provide further understanding of the present disclosure. The illustrative embodiments of the present disclosure and related description are intended to be explain the present disclosure, and are not intended to limit the scope of the present disclosure. In the drawings.

DETAILED DESCRIPTION

It should be noted that, when there is no conflict, the embodiments and features in the embodiments may be combined with one another. The present disclosure will be described in detail below with reference to drawings and embodiments.

For those skilled in the art to better understand the present disclosure, the technical solution provided in the disclosed embodiments are clearly and completely described together with the accompanying drawings of the embodiments. Apparently, the described embodiments are merely a portion of the present disclosure and do not represent all the embodiments. Based on the embodiments of the present disclosure, all the other embodiments obtained by those skilled in the art without any creative effort should also be in the scope of the present disclosure.

It should be noted that, terms of "first", "second", and the like in the specification, the claims, and the drawings are merely used to distinguish different objects and do not indicate any order or sequence. It should be understood that, data used in such ways can be interchangeable under suitable conditions, to describe the embodiments of the present disclosure. In addition, terms "include", "have", and their other variants are meant to cover non-exclusive inclusion. For example, a process, method, system, product, or apparatus that includes a series of steps or units should not be limited to the clearly listed steps or units, and may also include other steps or units not listed or steps or units inherent to such process, method, system, or apparatus.

Embodiments of the present disclosure provides a system for CDN-based mobile terminal traffic processing.

Figure 1:
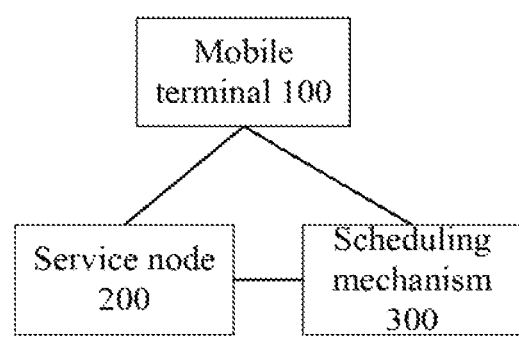
FIG. 1 illustrates an CDN-based exemplary mobile terminal traffic processing system according to a first embodiment of the present disclosure.

FIG. 1 illustrates a system for CDN-based mobile terminal traffic processing in the first embodiment of the present disclosure. As shown in FIG. 1, the system may include a mobile terminal 100, a service node 200, and a scheduling mechanism 300.

The mobile terminal 100 may be installed with an application. When the application starts, the mobile terminal 100 may send data information of the application to the scheduling mechanism 300. The data information may include the data information of the service types of the application traffic.

The service node 200 may be configured to direct the application traffic.

The scheduling mechanism 300 may be configured to determine the addresses of service node based on the received data information and send the addresses of the service nodes to the traffic control module of the mobile terminal 100. The traffic control module of the mobile terminal 100 may also be configured to direct the application traffic to the corresponding service node based on the addresses of the service nodes and the service types of application traffic. The service types of the application traffic may be the service types of the application, recognized based on the traffic sent by the application.

Optionally, in the disclosed system for CDN-based mobile terminal traffic processing, the mobile terminal 100 may also be configured to obtain quality monitoring data. The quality monitoring data may be configured to analyze the operation quality of the system.

Optionally, in the disclosed system for CDN-based mobile terminal traffic processing, the scheduling mechanism 300 may be configured to receive the quality monitoring data sent from the mobile terminal 100, and execute analysis to obtain the result of analysis. The scheduling mechanism 300 may be configured to execute related processing based on the result of analysis.

Optionally, in the disclosed system for CDN-based mobile terminal traffic processing, the scheduling mechanism 300 may also be used to sample the operation quality data and operation parameters according to a second preset cycle, and adjust the operation parameters based on the operation quality data.

It should be noted that, an application may be installed on the mobile terminal 100 in the disclosed embodiments. The application may be embedded with software development kit (SDK). The server node 200 may include a plurality of server nodes, and the plurality of service nodes may include first-level service nodes.

It should be noted that, the application may be embedded with an SDK configured in advance, or the application may implement traffic control by applying certain functions of the application. In one embodiment, an SDK may be used to illustrate the disclosure. However, the disclosure should not be limited by the embodiments. For those skilled in the art, various changes and modifications may also be included in the disclosure. Any modifications, equivalent substitutions, improvements, and the like within the spirit and principle of the present technical solution should all be included in the scope of the present disclosure.

Specifically, when the application starts, the SDK may report the application name, and the network environment and the geographical location of the mobile terminal 100 to the scheduling mechanism 300. The scheduling mechanism 300 may select a plurality of first-level service nodes and allocate the addresses of the nodes to the SDK based on the service types configured for the application, load condition of each first-level service node, geographical location, and carrier type, and so on. Each service type may be allocated with at least one service node having a corresponding type. The SDK may direct the application traffic to the corresponding service nodes based on a list of nodes and the service types of the traffic. The scheduling mechanism 300 may periodically assign new list of service nodes to the SDK.

It should be noted that, the service type refers to the type of traffic. Different content and protocols may correspond to different service types. For example, video traffic may be forwarded to nodes for processing video operation, image traffic may be forwarded to nodes for processing image operation, HTTP protocol traffic may be forwarded to HTTP nodes, and RTMP protocols may be forwarded to RTMP nodes. Each node may support limited service types, which may be different.

Figure 2:
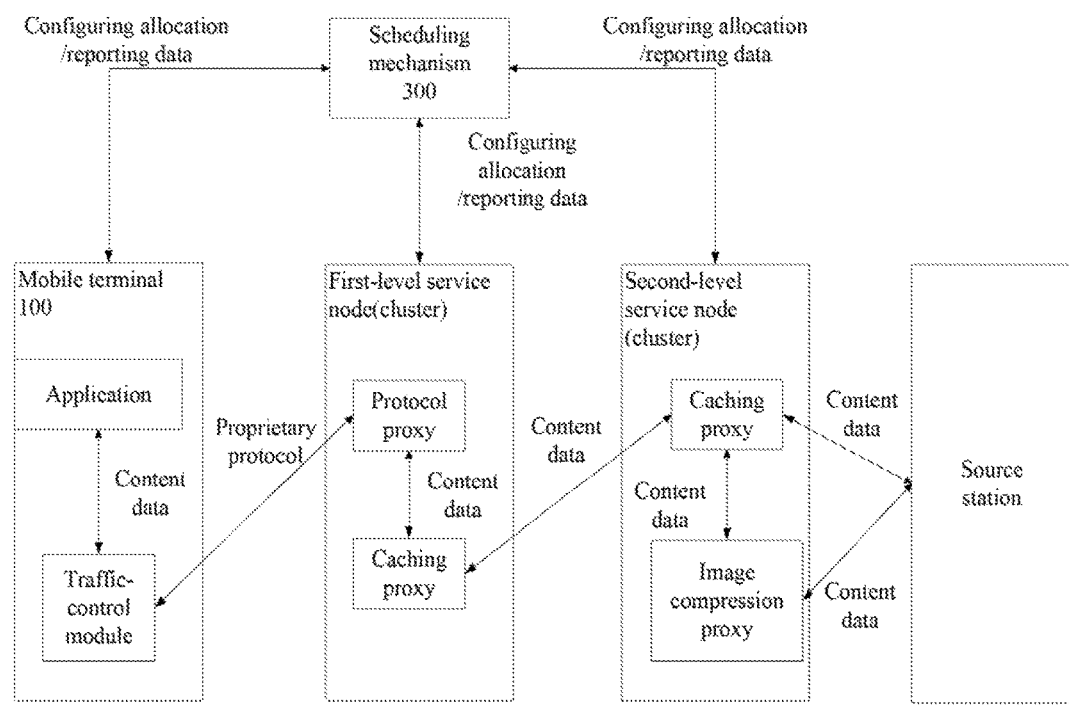
FIG. 2 illustrates an exemplary structure of the mobile terminal traffic processing system according to the first embodiment.

FIG. 2 illustrates the structure of system for CDN-based mobile terminal traffic processing in the first embodiment of the present disclosure. Specifically, the mobile terminal 100 may be installed with an application. When the application starts, the mobile terminal 100 may transmit the data information of the application. The data information may include the data information of the service types of the application traffic. The SDK may be embedded in the application and may function in the process of the application. The main function may be traffic directing and being the client terminal of the bilateral protocol optimization. The service node 200 may include first-level service nodes, second-level service nodes, third-level service nodes, etc. The first-level service nodes may be edge nodes, located on the edges of the network topology. The SDK may directly communicate with the first-level server nodes. The function of the protocol proxy may be protocol conversion. The SDK and the protocol proxy may communicate through proprietary protocols. All the bilateral protocol optimizations may be based on the proprietary protocols. The caching proxy may be a key component of a conventional CDN, and may mainly be in charge of the caching and proxy service of various content. The caching proxy may mainly support HTTP protocol, and may support other protocols based on different service types and operations. Second-level service nodes may be parent nodes, located at the center of the network topology, and may perform all functions of the first-level service nodes except for the protocol conversion function. Besides, the second-level service nodes may also perform transcoding functions for images and videos. Second-level service nodes may be BGP nodes, and may be in charge of cross-carrier line access (e.g., switching from mobile entrance to telecom exit). The service nodes may include multiple levels, and the functions of the service nodes having a higher level than the second-level service nodes may be substantially the same as the second-level service nodes and are omitted in the system structure figure. The scheduling mechanism 300 may be in charge of global control, and may periodically allocate configurations to all SDKs and service nodes. Meanwhile, the scheduling mechanism 300 may collect the logs reported by the SDKs and the service nodes, to monitor the system and analyze improvement. For each application, there is a group of configuration in the scheduling mechanism 300 being different with other applications, and the configuration allocated to an SDK may be according to the application belonged to the SDK.

It should be noted that, from the perspective of operation model "third-party CDN enterprise providing service to internet or conventional enterprise clients", the application and the source station in the system structure figure may be the initial components of an enterprise's client, the other parts may be the components of the system. The "content data" in the system structure figure and data stream figure may be based on any TCP protocols, such as HTTP, RTMP, etc. The content may include and may not be limited to webpages, videos, images, etc. In practice, service nodes may be in the form of clusters. Each cluster may include a plurality of servers, having a uniform IP entrance to the outside. This may be a conventional architecture of CDN.

Figure 3:
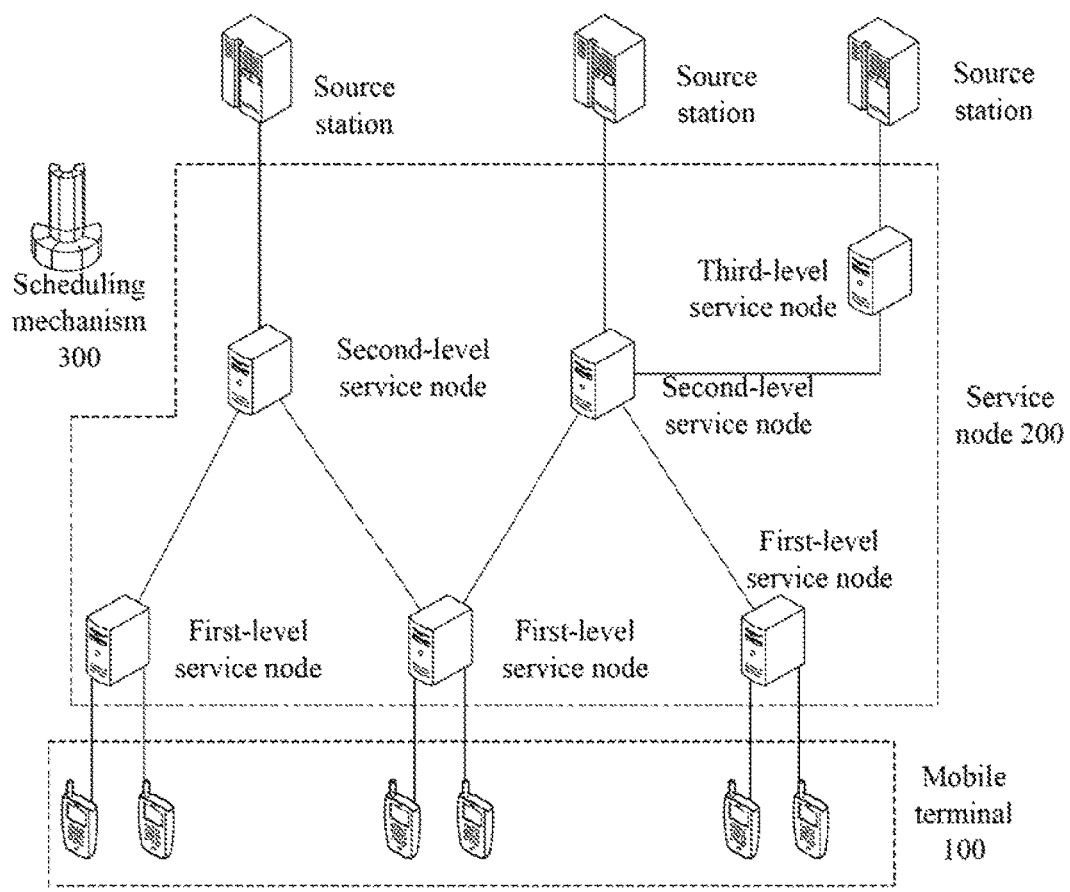
FIG. 3 illustrates another exemplary system for CDN-based mobile terminal traffic processing according to a second embodiment of the present disclosure.

FIG. 3 illustrates a system for CDN-based mobile terminal traffic processing according to the second embodiment of the present disclosure. To plan an optimized path, in the system for CDN-based mobile terminal traffic processing according to the present disclosure, the service node 200 may periodically initiate a detection on each available link in the domain name of the source station, including direct return-to-source links and each return-to-source link passing server nodes of higher levels. The server node 200 may record the response time of an optimized path.

When the application starts, the SDK may initiate detection on all first-level server nodes in the list based on the list of first-level server nodes allocated by the scheduling mechanism 300. A detection request may include all the domain names required by the application. The first-level server nodes may, based on each domain name in the detection request by the SDK, return the response times of the optimized links associated with the domain name, to the SDK, as the response of detection request. The SDK may report the response results, response times, and response content to the scheduling mechanism 300. The scheduling mechanism 300 may make a decision on the detection, to select an optimized server node for each service type, and allocate the decision to the SDK. The decision may be based on the response times and if the service type of each link can be cached. When the service type is non-cacheable (the request must return to source), the link having the shortest time to return to the source may be selected as the planning result. When the service type is cacheable, the link having the shortest time from the SDK to the first-level server node may be selected as the planning result. The SDK may direct the application traffic to the corresponding optimized server nodes based on the service types of the traffic. It should be noted that, when the network environment of the mobile terminal 100 changes, e.g., network standard switches, the path optimization may be re-planned.

Optionally, in the system for CDN-based mobile terminal traffic processing provided in the embodiments of the present disclosure, when an application starts, the SDK may report the application name, the current network environment, and device environment to the scheduling mechanism 300. The mechanism 300 may configure a different encryption algorithm and encryption level for each service type based on the configuration of the application and the network environment of the SDK. When the SDK is directing application traffic, based on the configuration allocated by the scheduling mechanism 300, the SDK may create a plurality of connections to the first-level server nodes, each connection having a different encryption algorithm and encryption level. Traffic of different service types may be carried by the corresponding encrypted connection according to the configuration. The protocol proxy may recognize the encryption algorithms and encryption levels used by the SDK, and may communicate, encrypt, and decrypt at the same condition. When the network environment of the mobile terminal 100 changes, e.g., network standard switches, the security check configuration may be updated.

It should be noted that, 1. The network environment may refer to the network conditions such as network standard, and names and types of access points. The device environment may refer to the conditions of the phone, e.g., the name of operating system, the version of the operating system, and the model of the phone. 2. A more complex encryption algorithm may form a higher encryption level, and a lower transmission efficiency. There is a trade-off between data privacy needs and transmission efficiency, to assign a different encryption algorithm and encryption level for each service type. Thus, multiple levels of security check may be used.

Optionally, for multi-level compression encoding and caching of content, in the system for CDN-based mobile terminal traffic processing provided by the disclosed embodiments, high-level server node 200 may compress and encode the content of the traffic through a plurality of compression algorithms and compression levels, and further cache the compressed content separately. When the SDK sends an application request, reporting the network environment and device environment of the mobile terminal 100 to the service node 200, the service node 200 may make a selection based on the network speed of the mobile terminal 100 and the processing capacity of the CPU, to select content having a highest comprehensive efficiency to return to the SDK as the response. After receiving the response, the SDK may decode/unzip the content based on corresponding algorithm and level, and then return the content to the application.

Optionally, for smart adaption of the content, in the system for CDN-based mobile terminal traffic processing, when the application initiates a content request, the SDK may notify the service node 200 the device environment and the network environment of the mobile terminal 100. The service node 200 may select a proper processing method based on the environment of the mobile terminal 100. The content after the processing may be referred to as adaptive content, and the unprocessed content sent back to the source station may be referred to as the original content. The service node 200 may firstly check if the adaptive content has hit the cache. If the adaptive content has hit the cache, the adaptive content may return the adaptive content to the SDK. If the adaptive content did not hit the cache, the service node 200 may recheck if the original content has hit the cache. If the original content has hit the cache, the original content may undergo adaption processing to be generated as adaptive content, which is returned to the SDK and written to cache. If the original content did not hit the cache, after the service node 200 sends a return-to-source request and obtains the original content, the original content may undergo adaptive processing to be generated as adaptive content, which is returned to the SDK and written to cache. The SDK may return the adaptive content to the application.

Optionally, in the disclosed system for CDN-based mobile terminal traffic processing, the SDK may recognize the service types of the first-level service nodes according to the configuration of the scheduling mechanism 300, and may use proper configuration to create connections based on session protocol. The session protocol may be based on TCP, and may allow multi-stream to be transmitted in parallel on one TCP connection. Meanwhile, the connection may be maintained for a long time, and connections may not need to be created for new requests. Each data stream may correspond, to a request sent by an application. The SDK and the first-level server nodes may perform lossless compression on the data streams, and may unzip the received data streams. This action may be transparent to the application, the high-level server node 200, and the source station. Each data stream in the session protocol may select whether to be transmitted using a tunneling method. The SDK may determine the protocols that can be recognized by a node based on the service type of the node. When the SDK forwards application traffic, the protocol type of each request in the traffic may be recognized. When the protocol type can be recognized by the service node 200, the request may be transmitted using non-tunneling method. When the protocol type cannot be recognized by the service node 200, the request may be transmitted using tunneling method.

It should be noted that, in the TCP/IP model, protocols such as TCP/UDP/SCTP may be transport layer protocols, and protocols such as HTTP/RTMP/XMPP may be application layer protocols. According to the classification of TCP/IP model, the protocol may be an application layer protocol. However, the protocol does not directly carry content entities, and may be above the TCP protocol and below the application layer protocols that carry content entities such as HTTP, as an abstract model. Thus, the fifth layer, i.e., session layer, in the seven-layer model of OSI may be used to label the layer with changed protocol.

Optionally, in the disclosed system for CDN-based mobile terminal traffic processing, when the application starts, the SDK may report the application name, the current network environment, and the device environment to the scheduling mechanism 300. The scheduling mechanism 300 may configure a different transport layer protocol and protocol stack parameters for each service type based on the configuration of the application and the network environment of the SDK. When SDK is directing application traffic, based on the configuration allocated by the scheduling mechanism 300, the SDK may create a plurality of connections to first-level service nodes, each connection may include a different transmission protocol and different protocol stack parameters. Traffic of different service types may be carried by corresponding connections according to configurations. The protocol proxy may recognize the transport protocols and the protocol stack parameters used by the SDK, and may communicate under the same condition.

When the network environment of the mobile terminal 100 changes (e.g., network standard switches), the transport protocols and parameter configurations may be updated.

Optionally, for accessing quality monitoring, in the disclosed system for CDN-based mobile terminal traffic processing, when the SDK is directing the application traffic, the SDK may record the time consumption for actions, such as the transmission, waiting, receiving, and processing, of the request and the response of each application. The SDK may also record the scale, resource path, and service type of the request and the response, to generate access quality data and report the access quality data periodically to the scheduling mechanism 300. Service node 200 of each level may record the access quality data of the application traffic and the service condition of each component, to periodically report to the scheduling mechanism 300. The scheduling mechanism 300 may collect the access quality data of each SDK and the service node 200, to periodically generate a report with the name of the application per unit, and use the report for analyzing, controlling, and optimizing the system.

Optionally, in the disclosed system for CDN-based mobile terminal traffic processing, the system may automatically analyze the quality monitoring data reported by each SDK and service nodes 200, and extract abnormal situations and malfunctions, which mainly includes: specific link route congestion or clogging, service nodes down or service component crashed, and source station service abnormal.

For example, corresponding processing may be performed for each type of abnormal situation: 1. Specific link rout congestion or clogging: blocking the link in global traffic scheduling. 2. Service node 200 down or service component crashed: if a first-level service node is down or crashed, blocking the node in the list of first-level service nodes allocated to the SDK by the scheduling mechanism 300; if a higher-level service node 200, higher than the first-level service nodes, is down or crashed, blocking the node in the list of higher level service node 200 allocated to the first-level service nodes by the scheduling mechanism 300. 3. Source station service abnormal: sending a warning email to the owner of the source station, if the source station includes a backup having the same service capacity, the service node 200 may send return-to-source request to the backup in the source station.

Optionally, in the disclosed CDN-based mobile terminal processing system, the manager may set a range for each system configuration parameter that can potentially affect the access quality. The scheduling mechanism 300 may periodically perform fine-tuning on the system configuration parameter according to a rule, maintain the turned parameter for a certain time, collect access quality data, and compare the access quality data with the access quality data before the fine-tuning. If the overall system access quality decreases or stays unchanged after the fine-tuning, the fine-tuning may be considered ineffective. An opposite fine-tuning line (increasing or decreasing) may be used to tune the parameter. If the overall system access quality increases after the fine-tuning, the fine-tuning may be considered effective. The same fine-tuning trend (increasing or decreasing) may be used to continuously tune the parameter, until the access quality stays unchanged or decreases, or the parameter exceeds the range. The optimized values of the parameter may be ultimately obtained. The abovementioned steps may be performed repeatedly for each configuration parameter that may affect the access quality, until the entire system is optimized. Except for the manager setting a range for each system configuration parameter that may affect the access quality, the rest of the steps may be performed automatically by the system.

In the disclosed system for CDN-based mobile terminal traffic processing, the abovementioned scheme may enhance the transmission efficiency of the mobile network by using bilateral protocol optimization, and may support precise full-traffic scheduling and multi-level security check to improve stability and security. Various DNS contamination and traffic hijacking may be effectively avoided. Meanwhile, the original functions and operations of the CDN are not affected. The system may support all TCP-based application layer protocols traffic (e.g., RTMP, XMPP, and most of proprietary protocols, etc.) through tunneling technology, and may support HTTPS protocol without deploying a certificate on the proxy server. Problems in the traditional CDN, only supporting HTTP/HTTPS protocol traffic and requiring a certificate on the proxy server for HTTPS, may be solved. When the traffic is based on the non-HTTP protocols, the optimization of the system may still be effective.

In the system for CDN-based mobile terminal traffic processing, through the mobile terminal 100, an application may be installed on the mobile terminal 100. When the application starts, the mobile terminal 100 may send the data information of the application to the scheduling mechanism. The data information may include data information of the service types of the application traffic. The service node 200 may direct corresponding application traffic. The scheduling mechanism 300 may determine the addresses of the service nodes based on the received data information and send the addresses of the service nodes to the traffic control module of the mobile terminal 100. The traffic control module of the mobile terminal 100 may direct the application traffic to the corresponding service nodes based on the addresses of the service nodes and the service types of the application traffic. The service type of application traffic may be service type of an application recognized based on the traffic sent by the application. Low accuracy in scheduling, in the conventional technology when CDN is applied in mobile network, may be solved. The scheduling accuracy may be more accurate, and speed to access network may be further increased.

Figure 4:
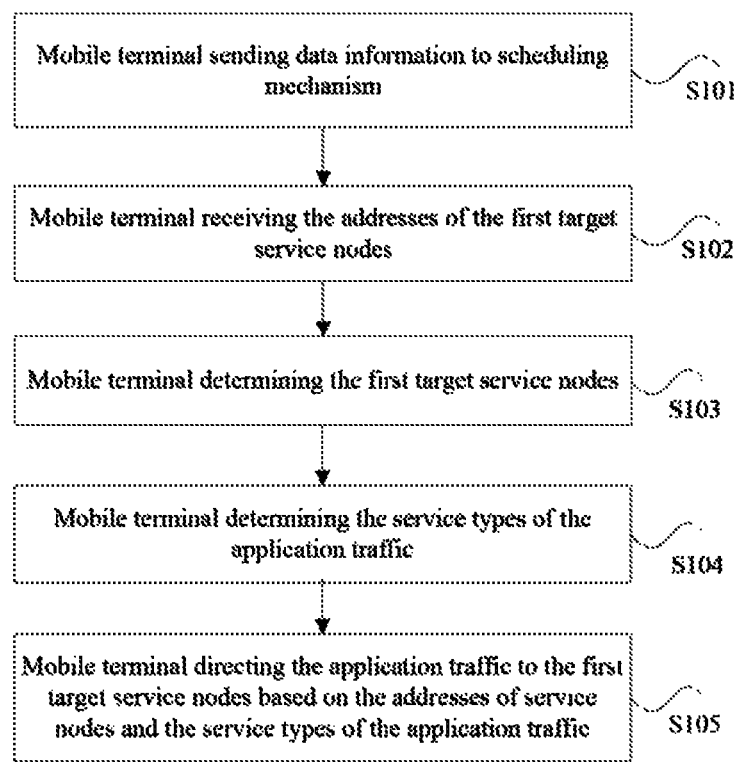
FIG. 4 illustrates an exemplary flow chart of a CDN-based method for mobile terminal traffic processing method according to the first embodiment.

FIG. 4 illustrates a flow chart of the method for CDN-based mobile terminal traffic processing according to the first embodiment. As shown in FIG. 4, the method may include the following steps S101-S105:

In step S101, the mobile terminal may send data information to the scheduling mechanism.

The mobile terminal may send the data information to the scheduling mechanism. An application may be installed on the mobile terminal. When the application starts, the application may perform the data acquisition on the service types configured for the application, to obtain data information. The scheduling mechanism may determine the addresses of the first target service nodes based on the data information.

It should be noted that, in the embodiments of the present disclosure, the data information may include data information of the application name, the network environment of the mobile terminal, and the geographical location of the mobile terminal.

In step S102, the mobile terminal may receive the address of the first target service node.

The mobile terminal may receive the addresses of the first target service nodes allocated by the scheduling mechanism.

In step S103, the mobile terminal may determine the first target service node.

The mobile terminal may determine the corresponding first target service nodes based on the address of the first target service node.

Optionally, after the mobile terminal determines the first target service node, and before the mobile terminal determines the service types of the application traffic, the method may further include: the mobile terminal sending a detection request to the first target service node, where the detection request may include a request for the path the application uses to access a desired domain name through the first target service node; the mobile terminal receiving response information, where the response information may include the information of response time using the path between a first target service node and the desired domain name; the mobile terminal sending the response information to the scheduling mechanism; and the mobile terminal obtaining a first target link, where the first target link may be a path determined by the scheduling mechanism based on the response information. The mobile terminal directing the application traffic to the first target service nodes based on the address of the service node and the service type of the application traffic may include: based on the first target link and the service type of the application traffic, directing the application traffic to the first target service node.

In step S104, the mobile terminal may determine the service type of the application traffic.

The mobile terminal may recognize the service type of the application based on the traffic generated when the application executes network access.

In step S105, the mobile terminal may direct the application traffic to the first target service nodes based on the addresses of the service nodes and the service types of the application traffic.

Optionally, the mobile terminal directing the application traffic to the first target service nodes based on the addresses of the service nodes and the service types of the application traffic may include: the mobile terminal determining the encryption algorithms and the encryption levels configured for the service types of the application, where the scheduling mechanism may configure the encryption algorithms and encryption levels configured for the service types of the application based on the data information; the mobile terminal creating a first connection to the first target service node, where the first connection may include a plurality of connections, each connection being applied with a different encryption algorithm and encryption level; the mobile terminal, based on the encryption algorithms and the encryption levels configured for the service types of the application, selecting the first connection to execute communication processing, and encryption and decryption processing.

Optionally, the mobile terminal directing the application traffic to the first target service nodes based on the addresses of the service nodes and the service types of the application traffic may include: the mobile terminal determining the service types of the first target service nodes; based on the service types of the first target service node, selecting a second connection based on the preset configuration of the session protocol, where the session protocol may be a session-layer multi-stream tunneling protocol with byte compression and the second connection may be connection transmitting multi-stream in parallel; and the mobile terminal transmitting a request sent by the application based on the second connection, where the request sent by the application may correspond to a data stream.

Optionally, the mobile terminal transmitting the request sent by the application based on the second connection may include: the mobile terminal determining the data stream corresponding to the request sent by the application; and the mobile terminal performing compression processing on the data stream.

After the mobile terminal directs the application traffic to the first target service nodes based on the address of the service node and the service type of the application traffic, the method may further include: the mobile terminal receiving the addresses of the second service nodes, where the addresses of the second service nodes may be the addresses of the service nodes sent by the scheduling mechanism after a first preset period after sending the addresses of the first target service nodes; and the mobile terminal directing the application traffic to the second service nodes based on the addresses of the second service nodes, where the second service nodes may be the service nodes corresponding to the addresses of the second service nodes.

Optionally, after the mobile terminal directs the application traffic to the first target service nodes based on the addresses of the service nodes and the service types of the application traffic, the method may further include: obtaining the first requested content sent by the application, where the first requested content may be the requested content sent by the application when executing network access; performing a compression encoding on the first requested content based on a preset compression algorithm and preset compression level, to obtain the first compressed content; and storing the first compressed content in a caching database.

Optionally, after storing the compressed content into the caching database, the method may further include: receiving a second requested content sent by the application; detecting if the second requested content is stored in the caching database; if the second requested content is stored in the cached database, the mobile terminal obtaining the content corresponding to the second requested content from the caching database; if the second requested content is not stored in the cached database, performing compression encoding on the second requested content according to a preset compression algorithm and a preset compression level, to obtain a second compressed content; storing the second compressed content into the caching database; and the mobile terminal obtaining the second compressed content.

Optionally, after the mobile terminal directs the application traffic to the first target service nodes based on the addresses of the service nodes and the services type of the application traffic, the method may further include: the mobile terminal transmitting a third requested content sent by the application to the first target service nodes, where the first target service nodes may be configured to detect if the third requested content matches with the property information of the mobile terminal; if the third requested content mismatches with the property information of the mobile terminal, detecting if the third requested content is stored in the caching database; if the third requested content is not stored in the caching database, obtaining the original content of the third requested content, where the original content may be the content not processed by the source station; processing the original content to obtain a processing result and the first target service nodes sending the processing result to the mobile terminal; and the mobile terminal obtaining the processing result.

It should be noted that, the abovementioned first requested content, the second requested content, and the third requested content may be sent from a same application or a same mobile terminal, or may be sent from different applications or different mobile terminals.

Optionally, after the mobile terminal performs compression processing on the data stream, the method may further include: the mobile terminal determining if the protocol types are protocol types recognizable to the service types of the first target service nodes; if the protocol types are protocol types recognizable to the service types of the first target service nodes, transmitting the request sent by the mobile terminal using a non-tunneling method; and if the protocol types are protocol types not recognizable to the service types of the first target service nodes, transmitting the request sent by the mobile terminal using the tunneling method.

Optionally, the mobile terminal directing the application traffic to the first target service nodes based on the addresses of service nodes and the service types of the application traffic may include: determining the transport layer protocols and protocol stack parameters configured for the service types of the application, where the scheduling mechanism may configure the transport layer protocols and protocol stack parameters for the service types of the application based on the data information; creating a third connection to the first target service nodes, where the third connection may include a plurality of connections, and different transport layer protocols and protocol stack parameters may be used on the third connection; and selecting the third connection to execute communication processing based on the transport layer protocols and protocol stack parameters configured for the service types of the application.

Figure 5:
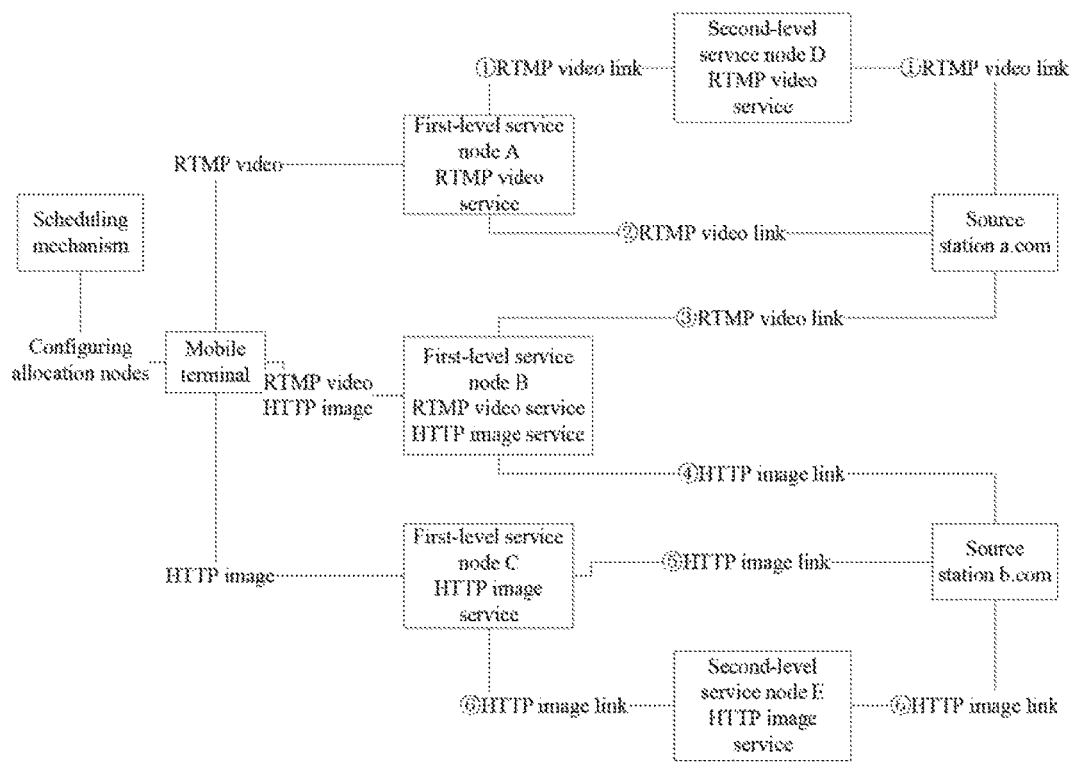
FIG. 5 illustrates an exemplary flow chart of an optional method for CDN-based mobile terminal traffic processing according to the first embodiment.

An embodiment is now used for detailed illustration. FIG. 5 illustrates an optional method for CDN-based mobile terminal traffic processing according to the first embodiment. As shown in FIG. 5, an application may provide two services, i.e., video broadcast and image browsing. The video broadcast may use RTMP protocol, the request may be dynamic and must be return-to-source. The image traffic may use HTTP protocol, and the request may be static and be cached by service nodes. The video traffic may correspond to domain name "a.com", and the image traffic may correspond to domain name "b.com", each corresponding to a source station that provides corresponding service. A smart mobile terminal device may be installed with the application, the network standard may be China Unicom 3G, and the geographic location may be Guangdong province. The screen resolution of the device may be 1280*720. The use of the application on the device may be as follows:

1. Traffic Scheduling: the SDK may report the application name, the network environment, and the geographical location to the scheduling mechanism. The scheduling mechanism may make a decision on traffic scheduling based on the information. The allocation may be as follows: distributing the first-level service nodes, of China Unicom and located in southern China, A, B, and C to the SDK. The three nodes may each have relatively small load, and relatively idle processing capacity. A and B may provide service for RTMP videos, and B and C may provide service for HTTP webpages. A second-level service node D may exist after the first service node A, and second-level service nodes E may exist after the first-level service node C. The second-level service node E may support transcoding compression of images. At this time, three RTMP video links ①-③ may exist, and three HTTP image links ④-⑥ may exist.

2. Optimized Path Planning:

In the first step, three first-level service nodes may each initiate detection towards all links. The response time of each link may be: ① 45 ms, ② 50 ms, ③ 70 ms, ④ 30 ms, ⑤ 20 ms, ⑥ 40 ms.

In the second step, the SDK may initiate detection towards three nodes, and the response time of the detection may be: A: 80 ms, B: 70 ms, C: 60 ms. The corresponding content of the three nodes may be: a.com=45 ms (corresponding to the minimum value of links ① and ②); B: com=70 ms; b.com=30 ms (corresponding to the links ③ and ④); C: com=20 ms (corresponding to the minimum value of links ⑤ and ⑥); the SDK may send the detection result of the second step and the response content returned by the nodes to the scheduling mechanism. The scheduling mechanism may make a decision for the link planning of SDK. Currently, it should be known by computing based on the result of [003], for the RTMP video broadcast requests that must be returned to the source, the optimized link from the terminal to the source station a.com may be link ①, passing node A, and the total response time may be 80+45=125 ms; for the static image requests that can be cached, the closest image service node to the terminal may be C, and the total response time may be 60 ms. Thus, the scheduling mechanism may plan the optimized link for the SDK. RTMP video traffic may be directed to node A, and HTTP image traffic may be directed to node C. The planning result may be allocated to SDK as configuration.

3. Multi-level security check: the video traffic may have relatively high data volume, low data security requirements, and higher real-time transmission rate. Thus, based on the configuration of the scheduling mechanism, the SDK may use low-level encrypted connection to direct video traffic. The image traffic may have moderate data volume, and low data security requirements. Thus, based on the configuration of the scheduling mechanism, the SDK may use medium-level encrypted connection to direct video traffic.

4. Multi-level content compression encoding and caching: the current network standard may be 3G and may have moderate transmission rate. Thus, the scheduling mechanism may allocate images having moderate compression configuration to the SDK. The application may initiate a request for an image with JPEG format, and the SDK may attach the compression configuration in the request and forward the request to node C. Node C may detect the content of the moderately-compressed image has hit the cache, and may obtain the content of the image from the cache to return the content to the SDK. The application may initiate another request for an image with PNG format, and the SDK may attach the compression configuration in the request and forward the request to node C. Node C may detect the content of the moderately-compressed image fail to hit the cache, and may thus forward the request to node E. Node E may also not cache the moderately-compressed PNG image, but node E may cache the original PNG image without compression. Node E may obtain the original image from the cache, moderately compress the original image, store it in the cache of the node E itself, and return it to node C. Node C may store the moderately-compressed PNG image, in the cache of node C itself, and return the moderately-compressed PNG image to SDK.

5. Content smart adaption: the application may send a request for a JPEG image, the SDK may forward the request to node C, attaching the screen resolution information of the mobile device. Nodes C and E may not cache the request for the image. Node E may forward the request to the source station to obtain the response of the original image. Node E may detect the size of the original image to be 1920*1080, and the resolution of the mobile device to be 1280*720. Thus, node E may equally scale the image to 1280*720, store the scaled image to the cache of node E itself, and return the scaled image to node C. Node C may detect the size of the scaled image to be the same as the resolution of the device and may not process the image. Node C may store the scaled image in the cache of node C itself and may return the scaled image to SDK. After receiving the image content obtained by SDK, the application ma display it on the screen. Due to the limitation of screen resolution, users may not realize the image was scaled.

6. Session layer multi-stream tunneling protocol with byte steam compression: because SDK and the corresponding service nodes may all normally analyze RTMP and HTTP, RTMP video streams and HTTP image streams may all be transmitted using non-tunneling method.

7. Transport layer bilateral protocol optimization: based on the network of the SDK and the service types of the application, the scheduling mechanism may generate Unicom 3G network, and HTTP image service-specific client and server configuration. The scheduling mechanism may allocate the configurations to SDK and node C. Based on the configuration allocated by the scheduling mechanism, the SDK may use Unicom 3G network and HTTP image service-specific TCP client protocol stack parameters to transmit data to node C. Meanwhile, the SDK may notify the network standard information of SDK itself to node C. Node C may detect the SDK uses Unicom 3G network and the images having HTTP as the traffic service type. Based on the configuration of the scheduling mechanism, node C may use Unicom 3G network and HTTP image-specific TCP protocol stack parameters to transfer data to the SDK.

8. Access quality monitoring: during the process of directing application traffic, the SDK may analyze each video broadcast request and each HTTP image request, and report data such as the sizes of the requests and the responses, the times to send, wait, and receive, and the uniform resource locator (URL) or the requests to the scheduling mechanism. When receiving the requests forwarded by the SDK, each node may similarly report the sizes of the requests and the responses, the times to send, wait; and receive, and the uniform resource locator (URL) of the requests to the scheduling mechanism. Meanwhile, the SDK may report conditions such as the operation condition of service components of the SDK itself, the RAM usage, the CPU usage, and read and write speed of hard disk to the scheduling mechanism.

9. Malfunction recovery and warning: at some point, node C may be down, at this time, the data reported by the SDK may reflect a large number of failed requests. The scheduling mechanism may send a self-test request to node C, and node C may have no response. At this time, the scheduling mechanism may automatically determine that node C cannot be accessed, allocate new traffic scheduling configuration to the SDK, and may replace node C with node B. The SDK may direct the HTTP image traffic to node B. At some point, source station B may malfunction, and all of nodes B, C, and E may not be able to access source station B. At this time, the scheduling mechanism may determine the source station B to be abnormal based on the return-to-source condition of the reports sent by nodes B, C, and E. The scheduling mechanism may send a warning email to the manager in charge of the source station B.

10. Service smart optimization: the session protocol may include traffic-control window parameters. The parameter may be $2^n$, and the manager may set the adjustment gradient to be $(n\pm1)$. The current value may be $2^{15}$ (32 KB), and the scheduling mechanism may automatically modify the Unicom 3G network traffic-control window parameter of the session protocol from 32 KB to 64 KB ($2^{16}$), and maintain the parameter for a day. The scheduling mechanism may observe all the access quality data reported by the SDK, extract time information, and compare it with the quality data of 32 KB. By comparison, it may be found that the access quality at 64 KB is improved. The scheduling mechanism may continue to increase the parameter to 128 KB ($2^{17}$), and maintain the parameter for a day. The scheduling mechanism may observe all the access quality data reported by the SDK, extract time information, and compare it with the quality data of 64 KB. By comparison, it may be found that the access quality at 128 KB is lower than the access quality at 64 KB. At this time, it may be considered that the traffic-control window parameters at 64 KB is the optimized value for the Unicom 3G. From now on, all the SDKs in the Unicom 3G may obtain the traffic-control window parameters at 64 KB. Other parameters may be continued to be verified and optimized.

According to the method for CDN-based mobile terminal traffic processing provided by the embodiments of the present disclosure, the mobile terminal may send data information to the scheduling mechanism, where the scheduling mechanism may determine the addresses of the first target service nodes based on the data information. The mobile terminal may receive the addresses of the first target service nodes. The mobile terminal may determine the first target service nodes, the first target service nodes being the service nodes corresponding to the addresses of the first target service nodes. The mobile terminal may determine the service types of the application traffic, where the service type of the application traffic may be the service types of the application recognized based on the traffic when the application is executing network access. Also, the mobile terminal may direct the application traffic to the first target service nodes based on the addresses of the services nodes and the service type of the application traffic. Low accuracy in scheduling, in the conventional technology when CDN is applied in mobile network, may be solved. The scheduling accuracy may be more accurate, and speed to access network may be further increased.

Figure 6:
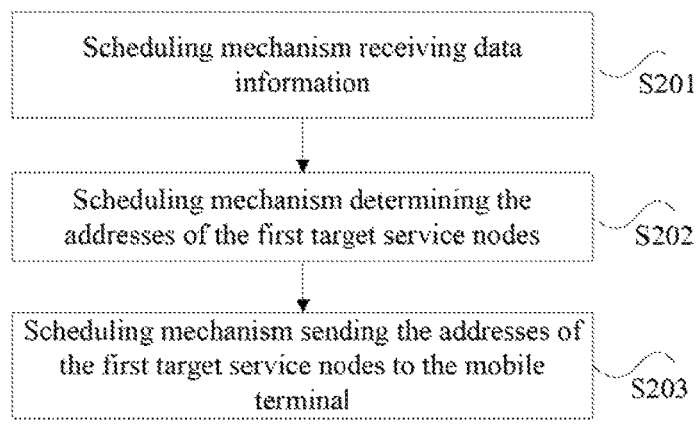
FIG. 6 illustrates another exemplary flow chart of a method for CDN-based mobile terminal traffic processing according to a second embodiment.

FIG. 6 illustrates a flow chart of the CDN-based mobile terminal processing method according to the second embodiment of the present disclosure. As shown in FIG. 6, the method may include the following steps S201-S203:

In step S201, the scheduling mechanism may receive data information.

The scheduling mechanism may receive data information. The mobile terminal may be installed with an application. When the application starts, data of the service types configured for the application may be acquired, and the data information may be obtained. The mobile terminal may be configured to send the data information to the scheduling mechanism.

It should be noted that, in the embodiments of the present disclosure, the data information may be data information such as the application name, the network environment of the mobile terminal, and the geographical location of the network terminal.

In step S202, the scheduling mechanism may determine the addresses of the first target service nodes based on the data information.

The scheduling mechanism may determine the addresses of the first target service nodes based on the data information reported by the mobile terminal.

In step S203, the scheduling mechanism may send the addresses of the first target service nodes to the mobile terminal.

The scheduling mechanism may send the addresses of the first target service nodes to the mobile terminal, where the mobile terminal may receive the addresses of the first target service nodes, and determine the first target service nodes based on the addresses of the first target service nodes. The mobile terminal may determine the service types of the application traffic. The mobile terminal may direct the application traffic to the first target service nodes based on the addresses of the service nodes and the service type of application traffic. The first target service nodes may be the service nodes corresponding to the addresses of the first target service nodes. The service types of the application traffic may be the service types of the application recognized based on the traffic when the application is executing network access.

According to the method for CDN-based mobile terminal traffic processing, the scheduling mechanism may receive data information. The scheduling mechanism may determine the addresses of the first target service nodes based on the data information. The scheduling mechanism may send the addresses of the first target service nodes to the mobile terminal. Low accuracy in scheduling, in the conventional technology when CDN is applied in mobile network, may be solved. The scheduling accuracy may be more accurate, and speed to access network may be further increased.

It should be noted that, the steps illustrated in the flow chart may be executed in, e.g., a computer system having a set of computer-executable commands. Further, although the logical order is shown in the flow chart, under certain circumstances, orders different from the disclosed order may be used to execute the illustrated or described steps.

Embodiments of the present disclosure further include a device for CDN-based mobile terminal traffic processing. It should be noted that, the disclosed device for CDN-based mobile terminal traffic processing may be used to execute the method for CDN-based mobile terminal traffic processing. The device for CDN-based mobile terminal traffic processing is now illustrated in detail as follows.

It should be noted that the device for CDN-based mobile terminal traffic processing may be implemented through the mobile terminal or the scheduling mechanism.

Figure 7:
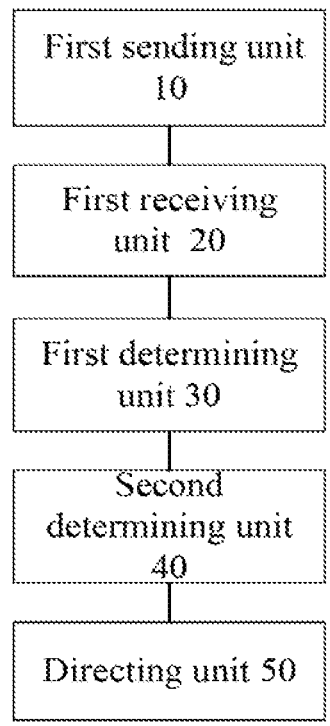
FIG. 7 illustrates an exemplary device for CDN-based mobile terminal traffic processing according to the first embodiment.

FIG. 7 illustrates a device for CDN-based mobile terminal traffic processing according to the first embodiment of the present disclosure. The embodiment may be implemented through the mobile terminal. As shown in FIG. 7, the device may include: a first sending unit 10, a first receiving unit 20, a first determining unit 30, a second determining unit 40, and a directing unit 50.

The first sending unit 10, may be configured to send data information to the scheduling mechanism. The first sending unit may be installed with an application. When the application starts, data of the service type configured on the application may be acquired, and the data information may be obtained. The scheduling mechanism may determine the addresses of the first target service nodes.

The first receiving unit 20, may be configured to receive the addresses of the first target service nodes.

The first determining unit 30, may be configured to determine the first target service nodes. The first target service nodes may be the service nodes corresponding to the addresses of the first target service nodes.

The second determining unit 40, may be configured to determine the service types of the application traffic. The service types of the application traffic may be the service type of the application recognized based on the traffic generated when the application is executing network access.

The directing unit 50, may be configured to direct the application traffic to the first target service nodes based on the addresses of the service nodes and the service types of the application traffic.

According to the device for CDN-based mobile terminal traffic processing, the first sending unit 10 may send the data information to the scheduling mechanism, where the sending unit may be installed with the application. When the application starts, data acquisition on the service types configured on the application may be performed to obtain the data information. The scheduling mechanism may determine the addresses of the first target service nodes based on the data information. The first receiving unit 20 may receive the addresses of the first target service nodes, the first determining unit 30 may determine the first target service nodes, where the first target service nodes may be the service nodes corresponding to the addresses of the first target service nodes. The second, determining unit 40 may determine the service types of the application traffic. The service types of the application traffic may be the service types of the application recognized based on the traffic when the application is executing network access. The directing unit 50 may direct the application traffic to the first target service nodes based on the addresses of the service nodes and the service types of the application traffic. Low accuracy in scheduling, in the conventional technology when CDN is applied in mobile network, may be solved. The scheduling accuracy may be more accurate, and speed to access network may be further increased.

Figure 8:
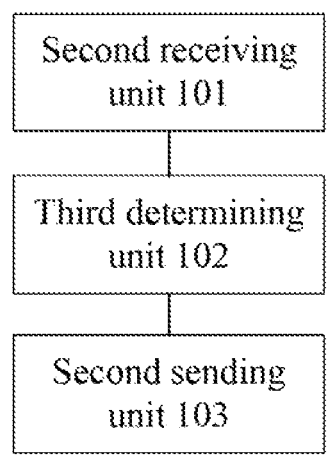
FIG. 8 illustrates another exemplary device for CDN-based mobile terminal traffic processing according to the second embodiment.

FIG. 8 illustrates a device for CDN-based mobile terminal traffic processing according to the second embodiment of the present disclosure. The embodiment may be implemented through the scheduling mechanism. As shown in FIG. 8, the device may include: a second receiving unit 101, a third determining unit 102, and a second sending unit 103.

The second receiving unit 101, may be configured to receive data information. The mobile terminal may be installed with an application. When the application starts, data of the service types configured on the application may be acquired, and the data information may be obtained. The mobile terminal may send the data information to the second receiving unit.

The third determining unit 102, may be configured to determine the addresses of the first target service nodes based on the data information.

The second sending unit 103, may be configured to send the addresses of the first target service nodes to the mobile terminal. The mobile terminal may receive the addresses of the first target service nodes and may determine the first target service nodes based on the addresses of the first target service nodes. The mobile terminal may determine the service types of the application traffic. The mobile terminal may direct the application traffic to the first target service nodes based on the addresses of the service nodes and the service types of the application traffic. The first target service nodes may be the service nodes corresponding to the addresses of the first target service nodes. The service types of the application traffic may be the service types of the application recognized based on the traffic generated when the application is executing network access.

According to the device for CDN-based mobile terminal traffic processing, the second receiving unit 101 may receive the data information, where the mobile terminal may be installed with the application. When the application starts, the service types configured on the application may be acquired to obtain the data information. The mobile terminal may send the data information to the second receiving unit. The third determining unit 102 may determine the addresses of the first target service nodes based on the data information. The second sending unit 103 may send the addresses of the first target service nodes to the mobile terminal. Low accuracy in scheduling, in the conventional technology when CDN is applied in mobile network, may be solved. The scheduling accuracy may be more accurate, and speed to access network may be further increased.

It should be noted that, each of the abovementioned method embodiments is described as a series of action combinations for the illustrative purposes. However, it should be known to those skilled in the art that, the present disclosure should not be limited by the order of the actions. According to the present disclosure, certain steps may be performed in other orders or may be performed simultaneously. Further, it should be known those skilled in the art that, the embodiments described in the specification are preferred embodiments, and that the actions and modules involved are not necessarily required by the present disclosure.

In the abovementioned embodiments, different features may be emphasized on different embodiments, the parts not thoroughly described in one embodiment may be referred to related description in other embodiments.

In some embodiments provided by the present disclosure, it should be understood that the disclosed device may be implemented in other ways. For example, the device embodiments described above are merely illustrative, such as division of the units is only a division based on logical functions. In practice, other divisions may also be used. For example, multiple units or components may be combined or integrated into another system, or some feature may be ignored, or not implemented.

An element described as separate components may or may not be physically separated. A component illustrated as a unit may or may not be a physical unit. That is, the element may be located in one place or may be distributed over a plurality of network elements. The scheme of the present invention may be realized by selecting some or all of the elements, depending on to actual needs.

In addition, the functional units in each embodiment of the present invention may be integrated in one processing unit, may each physically exist as a single unit, or two or more units may be integrated in one unit. The abovementioned integrated unit can be realized in the form of hardware or software functional units.

Apparently, it will be known to those skilled in the art that, the various modules or various steps of the present invention described above may be implemented using general purpose computing devices, which can be centralized on a single computing device or distributed over a network of computing devices. Alternatively, they may be implemented with program code executable by the computing device, so that they may be stored in the memory means to be executed by the computing devices, or they may be fabricated into separate integrated circuit modules, or form a plurality of modules or steps into a single integrated circuit module.

Thus, the present invention should not be limited to any particular combination of hardware and software.

The above description merely includes certain embodiments of the present disclosure, and is not intended to limit the present disclosure. For those skilled in the art, the present disclosure may also include various changes and modifications. Any modifications, equivalent substitutions, improvements and the like within the spirit and principles of the present invention are intended to be encompassed within the scope of the present invention.

What is claimed is:

1. A method for content delivery network (CDN)-based mobile terminal traffic processing, comprising:
    sending, by a mobile terminal, data information to a scheduling mechanism, wherein the mobile terminal is installed with an application, when the application starts, the mobile terminal acquires data for service types configured for the application to obtain the data information, the scheduling mechanism being configured to determine addresses of first target service nodes based on the data information;
    receiving, by the mobile terminal, the addresses of the first target service nodes;
    determining, by the mobile terminal, the first target service nodes, the first target service nodes being service nodes corresponding to the addresses of the first target service nodes;
    determining, by the mobile terminal, service types of application traffic, wherein the service types of the application traffic are service types of the application recognized based on traffic generated when the application executes network access; and
    directing, by the mobile terminal, the application traffic to the first target service nodes based on the addresses of service nodes and the service types of the application traffic.

2. The method according to claim 1, wherein after the mobile terminal directs the application traffic to the first target service nodes based on the addresses of the service nodes and the service types of the application traffic, further includes:
    receiving, by the mobile terminal, addresses of second service nodes, wherein the addresses of the second service nodes are addresses of service nodes sent by the scheduling mechanism after a first preset period after sending the addresses of the first target service nodes; and
    directing, by the mobile terminal, the application traffic to the second service nodes based on the addresses of the second service nodes, wherein the second service nodes are service nodes corresponding to the addresses of the second service nodes.

3. The method according to claim 1, wherein after the mobile terminal determines the first target service nodes, and before the mobile terminals determines the service types of the application traffic, further includes:
    sending, by the mobile terminal, a detection request to the first target service nodes, wherein the detection request includes a request for a path the application uses to access a domain name needed to be accessed through the first target service nodes;
    receiving, by the mobile terminal, a response information, wherein the response information includes information of response time of the path between a first target service node and a domain name needed to be accessed;
    sending, by the mobile terminal, the response information to the scheduling mechanism; and
    obtaining, by the mobile terminal, a first target link, wherein the first target link is a path determined by the scheduling mechanism based on the response information,
    wherein the mobile terminal directs the application traffic to the first target service nodes based on the address of the service node and the service types of the application traffic includes: based on the first target link and the service types of the application traffic, directing the application traffic to the first target service nodes.

4. The method according to claim 1, wherein the mobile terminal directing the application traffic to the first target service nodes based on the addresses of the service nodes and the service types of the application traffic includes:
    determining, by the mobile terminal, encryption algorithms and encryption levels configured for the service types of the application, where the scheduling mechanism configures the encryption algorithms and the encryption levels for the service types configured for the application based on the data information;
    creating, by the mobile terminal, a first connection to the first target service nodes, wherein the first connection includes a plurality of connections, the first connection being applied with different encryption algorithms and encryption levels; and
    based on the encryption algorithms and the encryption levels configured for the service types of the application, selecting, by the mobile terminal, the first connection to execute communication processing, and encryption and decryption processing.

5. The method according to claim 1, wherein after the mobile terminal directs the application traffic to the first target service nodes based on the addresses of the service nodes and the service types of the application traffic, further includes:
    obtaining a first requested content sent by the application, wherein the first requested content is requested content sent by the application when executing network access;
    performing a compression encoding for the first requested content based on a preset compression algorithm and a preset compression level to obtain a first compressed content; and
    storing the first compressed content in a caching database.

6. The method according to claim 5, wherein after storing the first compressed content in the caching database, further includes:
    receiving a second requested content sent by the application;
    detecting whether the second requested content is stored in the caching database;
    when the second requested content is stored in the caching database, obtaining, by the mobile terminal, content corresponding to the second requested content from the caching database;
    when the second requested content is not stored in the caching database, performing a compression encoding based on the preset compression algorithm and the preset compression level to obtain a second compressed content;
    storing the second compressed content in the caching database; and
    obtaining, by the mobile terminal, the second compressed content.

7. The method according to claim 6, wherein after the mobile terminal directs the application traffic to the first target service nodes based on the addresses of the service nodes and the service types of the application traffic, further includes:

transmitting, by the mobile terminal, a third requested content sent by the application to the first target service nodes, wherein the first target service nodes are configured to detect whether the third requested content matches with property information of the mobile terminal; when the third requested content mismatches with the property information of the mobile terminal, detecting whether the third requested content is stored in the caching database; when the third requested content is not stored in the caching database, obtaining original content of the third requested content, wherein the original content is content not processed by a source station; processing the original content to obtain a processing result, and the first target service nodes sending the processing result to the mobile terminal; and obtaining, by the mobile terminal, the processing result.

8. The method according to claim 1, wherein the mobile terminal directing the application traffic to the first target service nodes based on the addresses of the service nodes and the service types of the application traffic includes:

determining, by the mobile terminal, service types of the first target service nodes;

based on the service types of the first target service node, selecting and creating a second connection based on a preset configuration of a session protocol, where the session protocol is a session-layer multi-stream tunneling protocol with byte compression and the second connection is a connection transmitting multi-stream in parallel; and transmitting, by the mobile terminal, a request sent by the application based on the second connection, where the request sent by the application corresponds to a data stream.

9. The method according to claim 8, wherein the mobile terminal transmitting the request sent by the application based on the second connection includes:

determining, by the mobile terminal, the data stream corresponding to the request sent by the application; and performing, by the mobile terminal, compression processing on the corresponding data stream.

10. The method according to claim 9, wherein after the mobile terminal performs compression processing on the data stream further includes:

determining, by the mobile terminal, whether protocol types are protocol types recognizable to the service types of the first target service nodes;

when the protocol types are protocol types recognizable to the service types of the first target service nodes, transmitting the request sent by the mobile terminal using a non-tunneling method; and when the protocol types are protocol types not recognizable to the service types of the first target service nodes, transmitting the request sent by the mobile terminal using a tunneling method.

11. The method according to claim 1, wherein the mobile terminal directing the application traffic to the first target service nodes based on the addresses of the service nodes and the service types of the application traffic includes:

determining transport layer protocols and protocol stack parameters configured for the service types of the application, wherein the scheduling mechanism configures the transport layer protocols and protocol stack parameters for the service types of the application based on the data information;

creating a third connection to the first target service nodes, wherein the third connection includes a plurality of connections, and different transport layer protocols and protocol stack parameters are used on the third connection; and selecting the third connection to execute communication processing based on the transport layer protocols and protocol stack parameters configured for the service types of the application.

12. A device for content delivery network (CDN)-based mobile terminal traffic terminal, comprising:

a first sending unit, configured to send data information to a scheduling mechanism, wherein the first sending unit is installed with an application, when the application starts, data of service type configured for the application is acquired to obtain the data information, the scheduling mechanism being configured to determine addresses of first target service nodes based on the data information;

a first receiving unit, configured to receive the addresses of the first target service nodes;

a first determining unit, configured to determine the first target service nodes, the first target service nodes being service nodes corresponding to the addresses of the first target service nodes;

a second determining unit, configured to determine service types of the application traffic, wherein the service types of the application traffic is service type of the application recognized based on traffic generated when the application is executing network access; and a directing unit, configured to direct the application traffic to the first target service nodes based on the addresses of the service nodes and the service types of the application traffic.

13. A system for content delivery network (CDN)-based mobile terminal traffic terminal, comprising:

a mobile terminal, installed with an application, when the application starts, the mobile terminal sends data information of the application to a scheduling mechanism, wherein the data information includes the data information of the service types of the application traffic;

a service node, configured to direct the application traffic; and the scheduling mechanism, configured to determine addresses of service node based on the received data information and send the addresses of the service nodes to a traffic control module of the mobile terminal, wherein the traffic control module of the mobile terminal is configured to direct the application traffic to corresponding service nodes based on the addresses of the service nodes and the service types of application traffic, the service types of the application traffic being service types of the application recognized based on the traffic sent by the application.

14. The system according to claim 13, wherein:

the mobile terminal is configured to obtain quality monitoring data, wherein the quality monitoring data is configured to analyze operation quality of the system; and the scheduling mechanism is configured to receive the quality monitoring data sent from the mobile terminal, and execute analysis to obtain a result of analysis, the scheduling mechanism being configured to execute related processing based on the result of analysis.

15. The system according to claim 13, wherein the scheduling mechanism is further configured to sample operation quality data and operation parameters according to a second preset cycle, and adjust the operation parameters based on the operation quality data.

\* \* \* \* \*